United States Patent [19]

May

[11] Patent Number: 5,408,010
[45] Date of Patent: Apr. 18, 1995

[54] FLUOROORGANIC SOLI-RESIST AGENTS

[75] Inventor: Donald D. May, Chadds Ford, Pa.

[73] Assignee: E. I. Du Pont de Nemours and Company, Wilmington, Del.

[21] Appl. No.: 281,722

[22] Filed: Jul. 28, 1994

[51] Int. Cl.$^6$ .............................................. C08F 8/20
[52] U.S. Cl. ................... 525/327.4; 525/293; 525/327.6; 525/329.6; 525/359.1; 526/248
[58] Field of Search ............... 525/327.4, 327.6, 329.6; 526/248

[56] References Cited

U.S. PATENT DOCUMENTS 3,876,589  4/1975  Wasley et al. .................... 525/327.4
4,255,299  3/1981  Daimon et al. .................... 525/359

*Primary Examiner*—Bernard Lipman
*Attorney, Agent, or Firm*—Charles E. Feeny

[57] ABSTRACT

Fluoroalkyl-substituted maleic anhydride polymers, substrates treated therewith, and to novel processes for preparing and using the same. The polymers can be prepared by reacting: (1) terminally unsaturated alkenylamines or alcohols (e.g. allyl amine or alcohol, or diallyl amine) with maleic anhydride polymers, and (2) the resulting polymeric amides or esters with fluoroalkyl iodides in the presence of a free radical initiator. Dehydroiodination of the resulting product with base yields novel polymeric products which provide oil- and water-repellency as well as soil-resistance when applied to substrates, particularly nylon fibers.

6 Claims, No Drawings

FLUOROORGANIC SOIL-RESIST AGENTS

FIELD OF THE INVENTION

This invention relates to novel fluoroalkyl- substituted polymeric compositions which have utility as oil- and water-repellency agents and as soil-resist agents.

BACKGROUND OF THE INVENTION

Several of the currently-used soil-resist agents for nylon carpets are based on polymers derived from fluoroalkylethyl alcohols. The fluoroalkylethyl alcohols can be prepared from fluoroalkyl iodides by sequentially reacting with ethylene to form the corresponding fluoroalkylethyl iodides, then with oleum to form fluoroalkylethyl sulfates, followed by conversion to the fluoroalkylethyl alcohols by hydrolysis (U.S. Pat. No. 3,283,012). The fluoroalkylethyl alcohols are then incorporated into polymers for application to the fiber substrate (U.S. Pat. Nos. 3,378,609, 3,462,296, 3,491,169, 3,923,715, 4,595,518 & 4,958,039). The processes based on the preparation of fluoroalkylethyl alcohols from fluoroalkyl iodides have significant drawbacks. They involve several steps in which the expensive fluorocarbon moiety is subject to yield and handling losses; pressure equipment is required for some of the steps; and for every pound of fluoroalkylethyl alcohol formed, about two pounds of by-product sulfuric acid are formed and require disposal. It would be desirable if a suitable polymeric fluorocarbon-derived soil-resist could be prepared more directly from the fluoroalkyl iodides without the disadvantages of the currently-used and multiple-step technology needed to form the fluoroalkylethyl iodide and the fluoroalkylethyl alcohol.

BRIEF SUMMARY OF THE INVENTION

The present invention relates to novel compositions comprising fluoroalkyl substituted maleic anhydride polymers, substrates treated with such polymers, and to novel processes for preparing and using the same which avoid the disadvantages of the prior art. The polymeric compositions of this invention can be prepared by reaction of terminally unsaturated alkenylamines or terminally unsaturated alkenyl alcohols (said alkenyl amines and alcohols are at times referred to hereinafter as the "alkenyl compounds") with copolymers of maleic anhydride followed by the reaction of the resulting polymeric amides or esters with fluoroalkyl iodides in the presence of a free radical initiator. Dehydroiodination of the resulting product with base yields novel polymeric products which provide oil- and water-repellency as well as soil-resistance when applied to nylon fibers.

DETAILED DESCRIPTION OF THE INVENTION

The compositions of the present invention comprise polymeric compositions having the formula:

$$\left[ \begin{array}{c} \phantom{xx} \text{MO}-\overset{\overset{\displaystyle O}{\|}}{C} \phantom{x} \overset{\overset{\displaystyle O}{\|}}{C}-X-R^f \\ -CH_2-C-CH-CH- \\ \phantom{xxxxx} R \diagup \phantom{x} \diagdown R^1 \end{array} \right]_n$$

or $$\left[ \begin{array}{c} \phantom{xx} \text{MO}-\overset{\overset{\displaystyle O}{\|}}{C} \phantom{x} \overset{\overset{\displaystyle O}{\|}}{C}-X-R^f \\ -CH-CH-C-CH_2- \\ \phantom{xxxxxxx} R \diagup \phantom{x} \diagdown R^1 \end{array} \right]_n$$

wherein
$R^f$ is $C_3$ to $C_{20}$ fluoroalkyl radical having the formula: $YF_2C(F_2C)_x-$ in which Y is F, Cl, Br, or H, and x is 2 to 19;

R is H, $C_1$ to $C_{16}$ alkyl, or a radical having the formula:

[benzene ring with $R^2$, $R^3$, $R^4$ substituents]

$R^2$ is $R^5-CH=\overset{\overset{\displaystyle R^6}{|}}{C}-$ or $CH_2=CH-CH_2-$;

$R^3$ is H— or $CH_3O-$;
$R^4$ is H—, $CH_3-$;

$\overset{\overset{\displaystyle O}{\|}}{CH_3CO-}$, and
$R^3$ plus $R^4$ is $-O-CH_2-O-$;
$R^5$ is H—, $CH_3$; or

[phenyl group]—;

$R^6$ is H— or $CH_3-$;
X is $-NH-(CH_2)_aCH=CH-$, $-O-(CH_2)_aCH=CH-$, $\begin{array}{c} -N-CH_2-C=CH_2 \\ | \phantom{xxxx} | \\ CH_2\!-\!\!-\!\!-\!\!-\!CHCH_2- \end{array}$, or $\begin{array}{c} -N-CH=C-CH_3 \\ | \phantom{xxxx} | \\ CH_2\!-\!\!-\!\!-\!CHCH_2- \end{array}$;

a is 1 to 12;
M is H, $NH_4$, or Group IA metals, preferably Na or K; and
n is 1 to 2000.

For the purposes of the present invention, one can use various known polymers based on maleic anhydride and one or more cyclic and/or acyclic ethylenically unsaturated monomers. Examples of cyclic ethylenically unsaturated monomers suitable for the purposes of this invention include styrene, alpha-methylstyrene, 4-methyl styrene, stilbene, 4-acetoxystilbene, eugenol acetate, isoeugenol acetate, 4-allylphenol acetate, safrole, mixtures of the same, and the like. A variety of linear and branched chain alpha-olefins can also be used as monomers for the purposes of this invention. Particularly useful alpha-olefins are 1-alkenes containing 2 to 18 carbon atoms, such as ethylene, propylene, isobutylene, 1-butene, 1-hexene, 1-octene, 1-decene, 1-dodecene, 1-tetradecene, 1-hexadecene, 1-octadecene, and the like. Styrene/maleic anhydride copolymers are easily obtained, relatively inexpensive and yield products which perform well when applied to nylon substrates, and are therefore a preferred embodiment. Copolymers of maleic anhydride and isobutylene and those of maleic anhydride and 1-octene are of particular interest also, the former also being commercially available.

The terminally unsaturated alkenyl amine or alcohol useful for the purposes of this invention include but are not limited to allylamine, diallylamine, or allyl alcohol or any other terminally unsaturated aliphatic amine, diamine or alcohol. Allylamine is preferred and diallylamine is especially preferred because of the performance of the products derived from them. Among the alcohols suitable for reaction in the process of this invention allyl alcohol is preferred. Products of this invention derived from amines are preferred to those derived from alcohols because of the greater hydrolyric stability of the amides resulting firm the use of amines as reactants.

The fluoroalkyl iodide can be either a single fluoroalkyl iodide or a mixture of fluoroalkyl iodides having the formula: $YF_2C(F_2C)_xI$ wherein Y is F, Cl, Br or H, and x is 2 to 19. Preferably, x is about 4 to 16. In a more preferred embodiment, one uses a mixture of perfluoroalkyl iodides having the formula:

$$F(CF_2)_aI$$

wherein a is predominantly 6, 8 and 10. in a typical mixture of which, said iodides have the following approximate composition in relation to their $F(CF_2)_a$ radicals:

0% to 3% wherein a=4,
27% to 37% wherein a=6,
28% to 32% wherein a=8,
14% to 20% wherein a=10,
8% to 13% wherein a =12,
3% to 6% wherein a=14,
0% to 2% wherein a=16,
0% to 1% wherein a=18, and
0% to 1% wherein a=20.

Other fluorochemical reagents which can be used include a perfluoroalkyl iodide mixture of the formula shown below wherein a is predominantly 8, 10 and 12, in a typical mixture of which, said iodides have the following approximate composition in relation to their $F(CF_2)_a$ radicals 0 to 3% wherein a=6,
45% to 52% wherein a=8,
26% to 32% wherein a=10,
10% to 14% wherein a=12,
2% to 5% wherein a=14,
0% to 2% wherein a=16,
0% to 1% wherein a=18, and
0% to 1% wherein a=20.

Of the two compositions, the first one given above is the most preferred.

The free-radical initiators can be organic peroxides or persulfates, or commercial azo catalysts such as "VAZO" ®-52 2,2'-azobis(2,4-dimethylvaleronitrile) or "VAZO" ®-67 2,2'-azobis(2-methylbutyronitrile).

The novel polymeric compositions of this invention are self-dispersible in water at pH values above about 6, allowing solvent-free application to various nylon substrates. Alternatively, the use of $C_1$ to $C_{18}$ fatty amines or $C_1$ to $C_{18}$ fatty alcohols for partial replacement of the alkenyl compounds allows the preparation of polymer compositions which are soluble in organic solvents such as methyl isobutyl ketone (MIBK), tetrahydrofuran (THF), toluene, etc., and which can be formulated into stable aqueous dispersions. In a preferred embodiment, commercially-available hexadecylamine is used for this purpose at an hexdecylamine:alkenyl compound mol ratio in the range between 0.15:1 and 0.30:1.

The novel polymeric compositions of this invention impart oil-, water- and soil-repellency properties to fibrous and non-fibrous substrates. Suitable substrates for the application of the products of this invention are films, fibers, yarns, fabrics, carpeting, and other articles made from filaments, fibers, or yarns derived from natural, modified natural (e.g. regenerated cellulose, cellulose acetate, etc.), or synthetic polymeric materials, or from blends of these other fibrous materials and other porous materials which will absorb and transport low surface tension liquids either on their surfaces on in their interstices by capillary action. Specific representative examples are cotton, silk, regenerated cellulose, nylon, fiber-forming linear polyesters, fiber-forming polyacrylonitrile, cellulose nitrate, cellulose acetate, ethyl cellulose, paper, fiberglass, wood pressed or otherwise hardened wood composites, metals, unglazed porcelain, porous concrete and the like. Dyed and undyed cotton sateen, poplin, broadcloth, jean cloth, gabardine and the like are especially adaptable for treatment with the polymeric compositions of this present invention to provide products having a high repellency to oil and water and which are also relatively unaffected by the action of heat, air and light. Materials rendered soil-, oil- or water-repellent by the products of this invention retain a high portion of the original repellency after laundering and dry cleaning.

Two types of substrates are of particular interest in accordance with the present invention. One of those is carpeting, particularly nylon carpeting, to which novel compounds of the present invention are applied so as to impart oil-, water- and soil- repellency. The other class of substrates to which it is particularly advantageous to apply the compounds of the present invention so as to impart soil-release properties includes those prepared from polyamide fibers (such as nylon), cotton and blends of polyester and cotton, particularly such substrates being used in tablecloths, washable uniforms and the like. Of particular interest are polyamide carpeting, e.g. nylon carpeting, to which a preferred embodiment illustrated by Example is applied so as to impart oil-, water-, and soil-repellency.

The polymeric compositions of the present invention can be applied to suitable substrates by a variety of customary procedures. For the carpeting end-use, one can apply them by use of spray or foam applicators, nip rolls, the conventional beck dying procedure, continuous dying procedure or thread-line application (see for example, the padding procedures disclosed in U.S. Pat. Nos. 3,378,609 and 3,919,183 and the beck dyeing technique disclosed in U.S. Pat. No. 5,001,004, the contents of all three such patents being incorporated herein by reference). For application to washable apparel fabrics, the polymeric compositions of the present invention can be applied, for example, from an aqueous dispersion or an organic solvent solution by brushing, dipping, spraying, padding, roll-coating, foaming or the like. The polymeric compositions of this invention can be applied to the substrate as such or in combination with other textile or fluoro-finishes, processing aids, lubricants, anti-stains, etc. The polymeric compositions can also be blended with other agents which have oil/water repellency and soil release properties and applied to fibers or fabrics. They can be applied to dyed and undyed carpeting and other textile substrates.

In the process for preparing the polymeric compositions of this invention, the alkenyl compounds and the maleic anhydride polymer can be reacted at an alkenyl compound:maleic anhydride mol ratio in the range between 0.1:1 and 1:1; preferably said mol ratio is in the range between about 0.4:1 and 0.6:1. Mol ratios lower than about 0.4:1 result in a product with a low fluorine content, requiring uneconomically high application rates to achieve the desired 500 ppm fluorine in a treated nylon substrate. A mol ratio greater than 0.75:1 yields a less soluble product which is more difficult to apply to a substrate such as nylon. The reaction of the alkenyl compounds with the maleic anhydride copolymer is conveniently carried out in an aqueous medium at temperatures from 60° to 90° C., (optimally at 75° C.) for 3 hours at a concentration range of 5–30% solids (preferably 20%) and at atmospheric pressure. The reaction of the alkenyl compounds, such as allylamine or diallylamine, with a maleic anhydride polymer can be catalyzed by either acid or base. The consumption of the alkenyl amine in the reaction can be followed by monitoring pH, which decreases to a constant value as the amine reacts to form the amide. The products are generally soluble in water. A water-soluble base such as a an alkali metal or alkaline earth metal or ammonium hydroxide or carbonate can be used; however, a non-nucleophilic base such as a trialkylamine is preferred and triethylamine is most preferred because it minimizes the side reaction of maleic anhydride to maleic acid. The base can be added with the alkenyl amine to minimize undesired formation of amine salt products from the alkenyl amine and the maleic anhydride copolymer.

Without isolation and to the same reaction vessel containing the reaction product of the maleic anhydride copolymer with the alkenyl compound, such as allylamine or diallylamine, is added perfluoroalkyl iodide, a free-radical initiator, an alkaline base, and a solvent. The free radical-catalysed reaction with the perfluoroalkyl iodide can be carried out in water or in an organic solvent. Use of an aqueous system minimizes costs and eliminates solvent recovery and disposal. The use of a solvent, such as methyl isobutyl ketone, provides better solution control when incorporating aliphatic groups by the use of a $C_1$ to $C_{18}$ alkyl amine, such as hexadecylamine. The alkaline base can be ammonium hydroxide, or a hydroxide, carbonate or bicarbonate of Group IA or Group IIA metals. Preferred alkaline bases are ammonium hydroxide, and sodium or potassium hydroxide or carbonate. Preferably a concentrated aqueous solution of the base is employed, e.g. 25%–50% by weight. The presence of the solvent also provides more control over the final emulsion preparation. Heating is continued at a temperature up to the boiling point of the alkenyl compound (generally in the range between 40° and 100° C., e.g. about 75° C.) under a nitrogen atmosphere at least until analysis of the reaction solution shows substantially complete consumption of the perfluoroalkyl iodide. Generally, consumption of the perfluoroalkyl iodide has been completed in 8 to 24 hours; in an embodiment, heating was continued overnight (14 hours), thereby assuring that all of the free radical initiator had been consumed. Analysis for unreacted perfluoroalkyl iodide may be by gas chromatography. After this time, the reaction mass is discharged into a stirred solution of a dilute acid having a pKa value less than about 5; e.g. sulfuric acid or citric acid may be used. The reaction mass is brought to a pH in the range between 1 and 5 so as to precipitate the product. At a pH higher than 5, precipitation will not occur or it will be incomplete. Optimally, a pH at the upper end of the range (4.5–5.0) is used so as to minimize side reactions and the acid load on the system. The resulting precipitate is isolated, e.g. by filtration. The filter cake is washed with water and either vacuum-dried for analyses or redispersed in water at pH 7. Typical analysis shows about 39% fluorine content.

The aqueous redispersion can be applied to a nylon substrate, such as a 32 oz. level loop nylon carpet at standard mill application rates of about 250–500 ppm fluorine, based on the weight of the carpet, by topical spraying (greater or lesser amounts can be applied, but more than 500 ppm flourine fails to give noticeable benefit and below 250 ppm fluorine there is some fall-off in performance). Finally, the carpet can be heated in a forced air oven under standard mill conditions at a temperature and for a period of time sufficient to dry the carpet and to cure the polymeric product of this invention to the carpet. Commonly the treated carpet is heat a temperature in the range between 200° and 275° F. for 20 to 40 minutes, preferably at about 250° F. (121° C.) for about 25 minutes. Thereafter the treated carpet can be tested for soil-resistance in floor traffic tests, or by standard test methods, such as AATCC Method 123-1988.

Related polymeric compositions can be made by reacting allyl alcohol, allylamine, or diallylamine with acid anhydrides such as phthalic anhydride or pyromellitic dianhydride. For instance diallyl phthalate can be reacted with perfluoroalkyl iodides and the product isolated as described for the maleic acid copolymer resins. Also phthalic anhydride can be reacted sequentially with allylamine and perfluoroalkyl iodides. The products of such reactions with polymers other than those based on maleic anhydride show some improvement in soil-resistance by standard test methods such as AATCC Method 123-1988, but are not as effective as the polymers derived from the maleic anhydride, nor are they as durable on the fiber.

The preparation of the polymer compositions of this invention can be carried out in standard laboratory glassware. The reactions are run in a 1000 ml 4-neck flask fitted with a mechanical stirrer, a reflux condenser attached to an oil bubbler, a glass covered thermocouple well, and a nitrogen sparge tube. The Examples that follow are given to further illustrate the present invention. In the Examples, the apparatus described above is referred to collectively as the Reactor.

EXAMPLE 1

Into a Reactor were placed 20 grants of a styrene-maleic anhydride copolymer (molecular weight 1600), 8 grams of allyl amine, and 250 ml of water. The contents were stirred 3 hours at 65° C. to give a translucent solution. To the Reactor were then added 40 grams of the most preferred $F(CF_2)_aI$ defined above, 2 grams of the free radical initiator "VAZO" ®-67, 10 g. of 50% aqueous potassium hydroxide solution and 20 ml of methyl isobutyl ketone. The contents were sparged with nitrogen and heated at 75° C. for 14 hours and the contents were worked-up as detailed below to give, after vacuum oven drying, 52 grams of an off-white solid. After reaction, the contents were discharged at ambient temperature, about 20° C., into 400 ml of a mechanically stirred solution of dilute sulfuric or citric acid. The pH was adjusted to between 4.5 and 5.0, and the resulting precipitate isolated by filtration. The filter cake was washed with three 200 ml portions of water and analyzed, after vacuum oven drying, for fluorine by elemental analysis. This new material consists of 39% fluorine. IR analysis showed new absorbances at 1200 cm-1 and 1715 cm-1, indicating the incorporation of C—F linkages and amide linkages respectively. The solids were then redispersed into water at pH 7 and applied to 32 oz. level loop nylon carpet at 500 ppm fluorine by topical spraying. The carpet was dried in a forced air oven at 250° F. for 25 minutes. The carpet was tested for soil-resistance in competitive floor traffic tests. It shows less soiling than untreated carpet as measured by AATCC Method 123-1988.

EXAMPLE 2

Into a Reactor were placed 20 grams of a styrene-maleic anhydride copolymer (molecular weight 1600), 12 grams of diallyl amine, and 250 ml of water. The contents were stirred 3 hours at 90° C. to give a translucent solution. To the same reaction flask were added 40 grams of the $F(CF_2)_aI$ of Example 1, 25 grams of 50% aqueous potassium hydroxide solution, and 1 gram of the free radical initiator Vazo 67. An additional 1 gram of Vazo 67 was added 6 hours later. The contents were sparged with nitrogen and heated at 75° C. for 14 hours and the contents were worked-up as detailed below to give, after vacuum oven drying, 52 grams of an off-white solid. After reaction, the contents were discharged at ambient temperature into 400 ml of a mechanically stirred solution of dilute sulfuric acid, or citric acid. The pH was adjusted to between 4.5 and 5.0, and the resulting precipitate isolated by filtration. The filter cake was washed with three 200 ml portions of water and analyzed, after vacuum oven drying, for fluorine by elemental analysis. This new material consisted of 30% fluorine. IR analysis showed new stretches at 1200 cm-1 and 1715 cm -1 indicating the incorporation of C—F linkages and amide linkages respectively. The solids were then redispersed into water at pH 7 and applied to 32 oz. level loop nylon carpet at 500 ppm fluorine by topical spraying. The carpet was dried in a forced air oven at 250° F. for 25 minutes. The carpet was tested for soil-resistance in competitive floor traffic tests. It showed less soiling than untreated carpet as measured by AATCC Method 123-1988.

EXAMPLE 3

Into Reactor were placed 40 grams of a styrene-maleic anhydride copolymer (molecular weight 1600), 15 gms of hexadecylamine, and 1.5 gms of sulfuric acid as an amidation catalyst in 400 gms of methyl isobutyl ketone. The contents were stirred at 75° C. for 2 hours. Analysis at this stage showed consumption of the hexadecylamine, after which 14 grams of diallylamine were added. The contents were stirred 3 hours at 75° C. to give a translucent solution. To the same reaction flask were added 80 grams of the $F(CF_2)_aI$ of Example 1, 1 gram of the free radical initiator "VAZO" ®-67 and 50 ml of a 25% aqueous potassium hydroxide solution. The contents were sparged with nitrogen and heated at 75° C. for 16 hours during which time two additional 1 gram portions of the initiator were added. After reaction, 400 ml of water were added forming an emulsion, and the contents passed through a bed of Amberlite 410 to remove iodide. The resulting emulsion was distilled under pressure to give 400 gms of a dispersion that contains, by elemental analysis, 6.7% fluorine. The resulting emulsion was sprayed onto 32 oz. level loop nylon carpet and shows soil-resist properties relative to untreated carpet as measured by AATCC Method 123-1988.

I claim:

1. A composition comprising a copolymer having the formula:

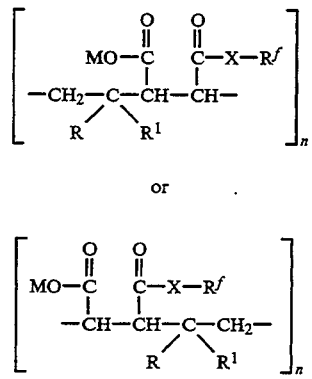

or wherein $R^f$ is at least one $C_3$ to $C_{20}$ fluoroalkyl radical having the formula:

$YF_2C(F_2C)_x$— in which Y is F, Cl, Br, or H, and x is 2 to 19;

R is H, $C_1$ to $C_{16}$ alkyl, or a radical having the formula:

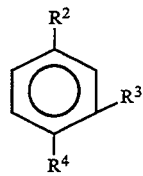

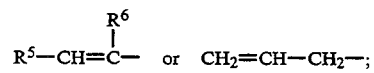

$R^2$ is $R^3$ is H— or $CH_3O$—;

$R^4$ is H—, $CH_3$—;

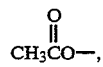

and $R^3$ plus $R^4$ is —O—$CH_2$—O—;

$R^5$ is H—, $CH_3$; or

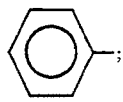
R⁶ is H— or CH₃—;
X is —NH—(CH₂)ₐCH=CH—, —O—(CH₂)ₐCH=CH—,
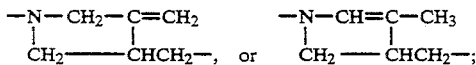
a is 1 to 12;
M is H, NH₄, or a Group IA or IIA metal; and
n is 1 to 2000.
2. The composition of claim 1 wherein Y is F.
3. The composition of claim 1 wherein Rᶠ is perfluroalkyl.
4. The composition of claim 1 wherein X is —NH—CH₂CH=CH—.
5. The composition of claim 1 wherein X is —O—CH₂CH=CH—.
6. The composition of claim 1 wherein X is
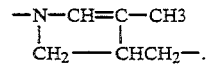
* * * * *